(12) United States Patent
Nook, III

(10) Patent No.: US 12,426,586 B2
(45) Date of Patent: Sep. 30, 2025

(54) MODULAR STRIPPING BUCKET

(71) Applicant: FYSH USA, LLC, Cleveland, OH (US)

(72) Inventor: Joseph H. Nook, III, Chardon, OH (US)

(*) Notice: Subject to any disclaimer, the term of this patent is extended or adjusted under 35 U.S.C. 154(b) by 109 days.

(21) Appl. No.: 18/346,005

(22) Filed: Jun. 30, 2023

(65) Prior Publication Data
US 2025/0000073 A1    Jan. 2, 2025

(51) Int. Cl.
*A01K 97/06*    (2006.01)
*B65D 21/08*    (2006.01)

(52) U.S. Cl.
CPC ............ *A01K 97/06* (2013.01); *B65D 21/086* (2013.01)

(58) Field of Classification Search
CPC ....... A01K 97/00; A01K 97/006; A01K 97/06
USPC .................................. 47/65.8; 220/677, 682
See application file for complete search history.

(56) References Cited

U.S. PATENT DOCUMENTS

| | | | | |
|---|---|---|---|---|
| 30,465 A * | 10/1860 | Curtiss | ................... | B65D 37/00 24/713.6 |
| 160,674 A * | 3/1875 | Hoff | ...................... | B65D 1/165 220/670 |
| 400,588 A * | 4/1889 | Meyering et al. | ...... | A01K 97/05 220/904 |
| 529,478 A * | 11/1894 | Bull | ...................... | B65D 29/00 220/904 |
| 938,431 A * | 10/1909 | Orcutt | ................... | B65D 37/00 220/904 |
| 1,087,702 A * | 2/1914 | Van Patten | .......... | B65D 33/007 220/904 |
| 1,143,171 A * | 6/1915 | Bushwick | ................ | A45C 3/06 190/103 |
| 1,144,633 A * | 6/1915 | Bowman | .................. | B65D 5/02 220/691 |
| 1,225,511 A * | 5/1917 | Sexton | ................... | B65D 33/10 383/17 |
| 1,240,817 A * | 9/1917 | Brumbaugh | ........... | B65D 25/42 220/9.2 |
| 1,243,381 A * | 10/1917 | Bokop et al. | ............ | A45C 3/00 383/906 |
| 1,278,806 A * | 9/1918 | Wheildon | .............. | B65D 37/00 220/9.3 |

(Continued)

FOREIGN PATENT DOCUMENTS

| | | | | |
|---|---|---|---|---|
| DE | 3310883 A1 | * | 9/1984 | |
| GB | 2059731 A | * | 4/1981 | ............. A01K 89/00 |

OTHER PUBLICATIONS

Product Description "Dragin Fly Products—The Round Mat," retrieved from https://www.draginflyproducts.com/new-products/the-round-mat, 5 pages, date retrieved: Jul. 24, 2025.

(Continued)

*Primary Examiner* — Morgan T Jordan
(74) *Attorney, Agent, or Firm* — BakerHostetler

(57) ABSTRACT

A stripping bucket is disclosed that includes a base and removable wall section. The base section can include one or more lugs, and the wall section can include one or more apertures. The wall section can also include a zipper. The apertures can be aligned with the lugs and the wall section can be wrapped around the base to form a stripping bucket. The zipper can be opened to remove the wall section from the base.

19 Claims, 6 Drawing Sheets

(56) References Cited

U.S. PATENT DOCUMENTS

| | | | | |
|---|---|---|---|---|
| 1,294,753 A * | 2/1919 | Banister | A45C 3/02 190/122 |
| 1,297,810 A * | 3/1919 | Dunn | A01G 9/0295 220/625 |
| 1,439,180 A * | 12/1922 | Magovern | A47J 47/18 383/29 |
| 1,478,497 A * | 12/1923 | Welch | A01K 97/06 224/660 |
| 1,979,475 A * | 11/1934 | Knettles | A01K 97/06 43/57.2 |
| 2,206,694 A * | 7/1940 | Greene | A01G 9/04 248/346.11 |
| 2,217,514 A * | 10/1940 | Henry | A47G 19/10 248/500 |
| 2,343,470 A * | 3/1944 | Nast | A47G 19/12 220/62.18 |
| 2,389,390 A * | 11/1945 | Silverman | A61J 9/0638 248/102 |
| 2,750,706 A * | 6/1956 | Seals | A01K 97/06 43/57.2 |
| 2,865,421 A * | 12/1958 | Walsh | A45C 7/0077 383/29 |
| 3,504,710 A * | 4/1970 | Pancoast | B29C 66/14 229/5.5 |
| 3,559,329 A * | 2/1971 | Chiu | A01K 97/20 493/103 |
| 3,746,066 A * | 7/1973 | McIntyre | A45C 7/0063 283/2 |
| 3,775,903 A * | 12/1973 | Pike | A01G 9/029 47/65.8 |
| 4,090,542 A * | 5/1978 | Hacker, Jr. | A45C 7/0077 383/41 |
| 4,216,622 A * | 8/1980 | Hollenbach | A01G 9/029 47/73 |
| 4,297,802 A * | 11/1981 | Normann | A01K 91/02 43/21.2 |
| 4,325,484 A * | 4/1982 | Berry | A01K 97/08 211/89.01 |
| 4,402,471 A * | 9/1983 | Normann | B65H 75/40 242/387 |
| 4,563,834 A * | 1/1986 | Spencer | A01K 97/06 43/57.1 |
| 4,679,242 A * | 7/1987 | Brockhaus | A45C 7/0059 383/18 |
| 4,682,803 A * | 7/1987 | Andrews | A01K 97/00 452/196 |
| 4,705,246 A * | 11/1987 | Wolf | B65B 67/12 141/390 |
| 4,733,806 A * | 3/1988 | Sloop | A45F 3/02 224/601 |
| 4,782,619 A * | 11/1988 | Richards | A45C 7/005 43/57.1 |
| 4,901,899 A * | 2/1990 | Barrett | A45C 7/0095 294/146 |
| 5,033,232 A * | 7/1991 | Vaughn | A01G 9/02 47/72 |
| 5,092,263 A * | 3/1992 | Hutchison | A01K 97/10 24/502 |
| 5,169,025 A * | 12/1992 | Guo | B65D 81/3876 215/393 |
| 5,182,877 A * | 2/1993 | Burchill | A01K 97/00 206/315.11 |
| 5,240,156 A * | 8/1993 | Sicotte | A45F 3/14 224/583 |
| 5,251,460 A * | 10/1993 | DeMarco | B65D 81/3886 62/400 |
| D349,773 S * | 8/1994 | Malin | D24/227 |
| 5,397,040 A * | 3/1995 | Lee | A01K 97/06 224/240 |
| D361,201 S * | 8/1995 | Chaney | D3/260 |
| 5,488,799 A * | 2/1996 | Hauschild | A01K 97/08 224/660 |
| 5,542,204 A * | 8/1996 | Heaney | A01K 97/00 43/4 |
| 5,628,141 A * | 5/1997 | Crawford | A01K 97/00 43/4 |
| 5,735,608 A * | 4/1998 | Branco | A45C 3/00 383/41 |
| 5,855,274 A * | 1/1999 | Piao | B25H 3/04 206/478 |
| 5,915,580 A * | 6/1999 | Melk | B65D 81/3886 220/592.24 |
| 5,996,267 A * | 12/1999 | Breckenridge | A01K 77/00 43/11 |
| 6,068,402 A * | 5/2000 | Freese | B65D 81/3897 383/110 |
| 6,119,390 A * | 9/2000 | Dickie | A01K 97/00 43/4 |
| 6,481,183 B1 * | 11/2002 | Schmidt | B65D 33/2525 53/139.2 |
| 6,640,856 B1 * | 11/2003 | Tucker | A45C 7/0077 383/4 |
| 6,920,993 B2 * | 7/2005 | Sheng-Bin | A45C 7/0036 220/4.28 |
| 7,163,340 B2 * | 1/2007 | Godshaw | B25H 3/00 383/41 |
| 7,676,983 B2 * | 3/2010 | Jenkins | A01K 97/08 248/512 |
| 7,832,584 B2 * | 11/2010 | Eggers | B25H 3/023 312/111 |
| 7,900,392 B2 * | 3/2011 | Musto | A01K 97/06 220/666 |
| D659,385 S * | 5/2012 | Campbell | D22/134 |
| 8,296,992 B1 * | 10/2012 | Caviness | A01K 97/06 141/331 |
| 8,800,234 B2 * | 8/2014 | Taillefer | F16B 5/0036 52/587.1 |
| 9,060,581 B2 * | 6/2015 | Lown | A45C 11/20 |
| 9,241,585 B2 * | 1/2016 | Marks | A47G 7/085 |
| 9,254,031 B1 * | 2/2016 | Zenoff | A47B 23/002 |
| 10,192,462 B1 * | 1/2019 | Gouboth | A47K 3/001 |
| 10,704,281 B1 * | 7/2020 | Stahlhut | E04H 15/003 |
| D903,431 S * | 12/2020 | Green | D7/607 |
| 11,191,380 B2 * | 12/2021 | Leatherman | B65D 81/3876 |
| 2002/0064323 A1 * | 5/2002 | Chin | A45C 13/103 383/97 |
| 2003/0015528 A1 * | 1/2003 | Schneider | B65D 37/00 220/9.2 |
| 2003/0159326 A1 * | 8/2003 | Meier | A01K 97/06 43/25.2 |
| 2004/0045966 A1 * | 3/2004 | Von Holdt, Jr. | B65D 43/0256 220/276 |
| 2005/0039378 A1 * | 2/2005 | Beech | A01K 97/05 43/55 |
| 2005/0211723 A1 * | 9/2005 | Alvarado | B65D 33/001 221/268 |
| 2005/0268527 A1 * | 12/2005 | Beech | A01K 97/05 43/44.99 |
| 2005/0284718 A1 * | 12/2005 | Tai | A45C 7/0077 383/4 |
| 2006/0027475 A1 * | 2/2006 | Gleason | B25H 3/021 190/110 |
| 2006/0236589 A1 * | 10/2006 | Boyette | A01K 97/10 43/55 |
| 2007/0157513 A1 * | 7/2007 | Varney | A01G 9/026 47/71 |
| 2007/0205191 A1 * | 9/2007 | Pyle | B65D 21/02 220/23.91 |
| 2008/0190021 A1 * | 8/2008 | Marks | A47G 7/085 47/65.8 |
| 2008/0222941 A1 * | 9/2008 | Scrimgeour | A01K 91/18 43/4.5 |
| 2009/0000569 A1 * | 1/2009 | Behravesh | A01K 13/006 119/815 |
| 2010/0314424 A1 * | 12/2010 | Liu | A45C 9/00 224/257 |
| 2011/0139091 A1 * | 6/2011 | Ohashi | A01K 13/006 119/856 |

(56) References Cited

U.S. PATENT DOCUMENTS

| | | | | |
|---|---|---|---|---|
| 2014/0013716 A1* | 1/2014 | Mallard | ................ | B65D 37/00 |
| | | | | 229/128 |
| 2018/0141698 A1* | 5/2018 | Barlas | .................... | B65D 37/00 |
| 2020/0008414 A1* | 1/2020 | Brouwer | ................... | A45F 3/14 |
| 2020/0071030 A1* | 3/2020 | Ager | ...................... | B65D 37/00 |
| 2020/0361660 A1* | 11/2020 | Aki | ................... | B65D 75/5816 |
| 2021/0068381 A1* | 3/2021 | Cutler | ...................... | B25F 1/00 |

OTHER PUBLICATIONS

Product Description "Dragin Fly Products—The Xtra-Large Mat," retrieved from https://www.draginflyproducts.com/new-products/xtra-large-mat, 5 pages, date retrieved: Jul. 24, 2025.

"Tight line tales of a fly fisherman," retrieved from http://www.tight-lined-tales-of-a-fly-fisherman.com/2016/08/fly-productstrip-and-feed-research.html, Aug. 29, 2016, 6 pages.

The Home Depot, Product Description "Ryobi Lawn and Leaf Bag," retrieved from https://homedepot.com/p/RYOBI-Lawn-and-Leaf-Bag-AC04313/300892184, 6 pages, date retrieved: Jul. 24, 2025.

Amazon, Product Description Aventik Eupheng Fly Line Basket, retrieved from https://www.amazon.com/Authentic-Stripping-Ergonomic-Minimize-Distance/dp/B072BM799R/, 8 pages, date retrieved: Jul. 24, 2025.

\* cited by examiner

MODULAR STRIPPING BUCKET

FIELD OF INVENTION

This disclosure relates to fly fishing line management, and more particularly receptacles for receiving fly line unspooled from the reel while an angler prepares to cast.

BACKGROUND

Different types of rods and reels for fishing abound in the modern marketplace. Several types of reels are designed to facilitate casting (as opposed to, for example, trolling reels that unspool line using a bait or weight to produce drag sufficient to spin the spool when the clutch is disengaged). Many reels designed for casting maintain the line on the spool until a cast but permit the line to pull freely from the reel from the force of a cast.

Fly fishing presents unique challenges compared with other casting techniques for fishing. Unlike other techniques where an angler uses a higher weight bait and a thinner line, fly fishing uses light flies as bait and propels the flies (and leader and tippet, which are more akin to other types of fishing line, to connect the fly line to the fly) using the weight of the heavier fly line. Because the angler casts the line itself, rather than the bait, fly line is significantly thicker than other fishing lines. To cast, a fly angler performs an action (such as a back cast or roll) to load the rod with unspooled line, which (with the angler's forward rotation of the rod) propels the fly line forward. Proficient fly anglers can "shoot" fly line, which occurs when the force imparted onto the line from the loading of the rod and the angler's cast is sufficient to continue pulling the line in the direction of the cast after the initial length (e.g., the line already beyond the last guide of the rod) is cast in the target direction.

Fly fishing reels do not have a bale, clutch, or other mechanism to selectively engage and disengage the drag of the reel. As such, a fly angler's casting distance is limited by the amount of line unspooled from the reel prior to the cast. Fly fishing often involves quick presentation of a fly to a fish, or area of water likely to hold fish, based on the conditions observed by the angler (e.g., fish "rising" or "tailing" to feed, disturbance on the surface of the water, fleeting opportunity to cast to a spot while in motion, break in the wind, and so forth). To ensure that the angler can make these quick presentations, sufficient line must be unspooled and ready to cast. This is further complicated in fly fishing situations where a fly angler may need to cast in multiple directions in short order, such as when fishing from a boat, offshore platform, or other open area of water where fish may be feeding in different directions around the angler.

Given the need for speed and flexibility in casting, many fly anglers strip out significant lengths of fly line to allow them to immediately cast at different distances and in different directions based on changing conditions and opportunities to place a fly near a feeding fish. But unspooled line can easily become hung up on an obstacle or tangled. This drawback is exacerbated by the nature of fly line-given its comparatively thick cross-section, it is likely to be blown around and, at a minimum, pushed to a less favorable casting position in windy conditions.

Given the foregoing, it would be beneficial to develop improved apparatuses for managing fly line.

SUMMARY

In an embodiment, a stripping bucket is provided. The stripping bucket includes a base section and a wall section that can be coupled and decoupled by arranging or removing apertures in the wall section over lugs of the base section.

In an embodiment, a wall section for a stripping bucket is provided. The wall section comprises a flexible wall; one or more apertures disposed toward a bottom of the flexible wall, wherein the one or more apertures are sized to receive one or more lugs of a stripping bucket base section through the one or more apertures; a first zipper section disposed on a first side of the flexible wall; and a second zipper section configured to engage the first zipper section to close the zipper, wherein the first zipper section and the second zipper section define a zipper.

In an embodiment, a base section for a stripping bucket is provided. The base section comprises a base foot arranged at the bottom of the base section and configured to rest on a flat surface; a base side extending upward from the base foot; and one or more lugs extending outward from the base side.

Other portions of this disclosure will describe various alternative and complementary embodiments. As such, the foregoing summary is provided for purposes of example only, and should not be deemed in any way to limit the scope or spirit of the disclosure or claims.

DETAILED DESCRIPTION

The current disclosure describes line management apparatuses, or "stripping buckets," for receiving fly line (or other material), overcoming the drawbacks of prior apparatuses.

As used herein, the "top" of a line management apparatus refers to the portion positioned closest to the reel, or the farthest from a surface on which a line management apparatus rests; and the "bottom" of a line management apparatus refers to the portion positioned farthest from the reel, or closest to (including in contact with) a surface on which a line management apparatus rests.

Figure 1:
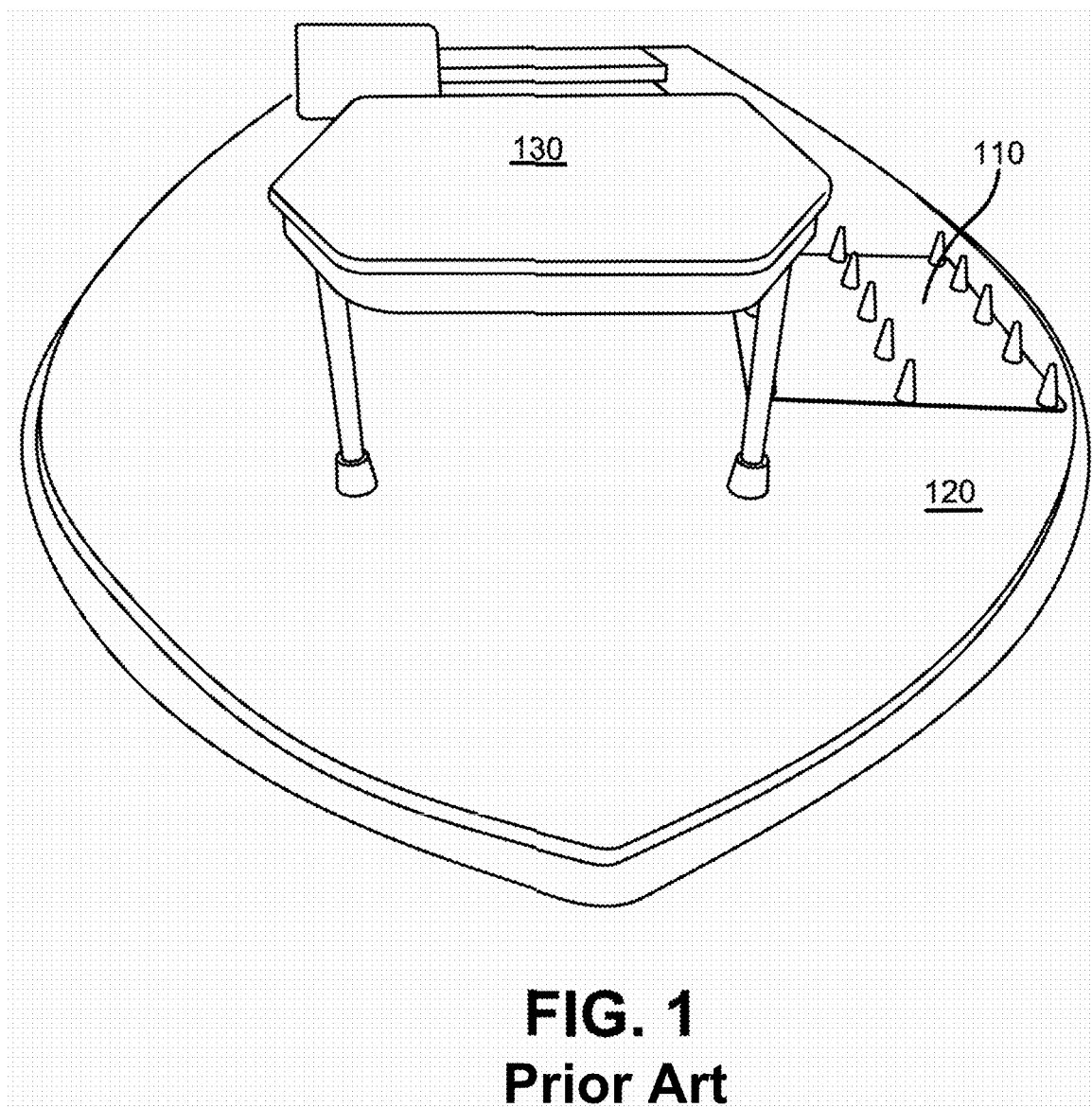
FIG. 1 illustrates an example line management apparatus on a boat.

FIG. 1 illustrates an example line management apparatus 110 located on a skiff 120 to explain an example environment in which line management apparatuses are used. Line management apparatus 110 is a mat including a series of spikes designed to capture portions of fly line to limit how far stripped line can be blown or displaced. Skiff 120 also includes casting platform 130, which elevates an angler from the deck of skiff 120 to permit better visibility and casting geometries.

Figure 2A:
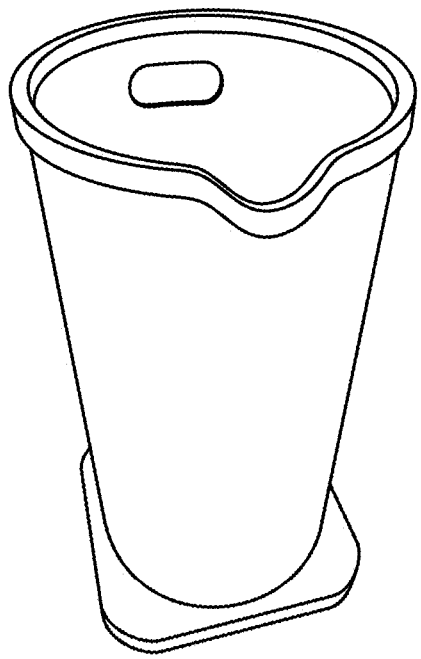
FIG. 2A, FIG. 2B, FIG. 2C, and FIG. 2D illustrate various examples of line management apparatuses.

FIG. 2A, FIG. 2B, FIG. 2C, AND FIG. 2D illustrate various examples of alternative line management apparatuses. FIG. 2A shows an example bucket configured to receive stripped fly line. These types of buckets must include a heavy base at the bottom to keep them upright in dynamic situations such as when even small waves rock a fishing boat or when wind is blowing. Further, because the bucket is one piece with a rigid, fixed shape, it is unwieldy and takes up a significant amount of space. Due to the weight and dimensions of rigid bucket designs capable of remaining upright, they are difficult to travel with and anglers may leave them behind even on short trips. Moreover, stores typically cannot stock these types of stripping buckets in any volume because of their large footprint.

Figure 2B:
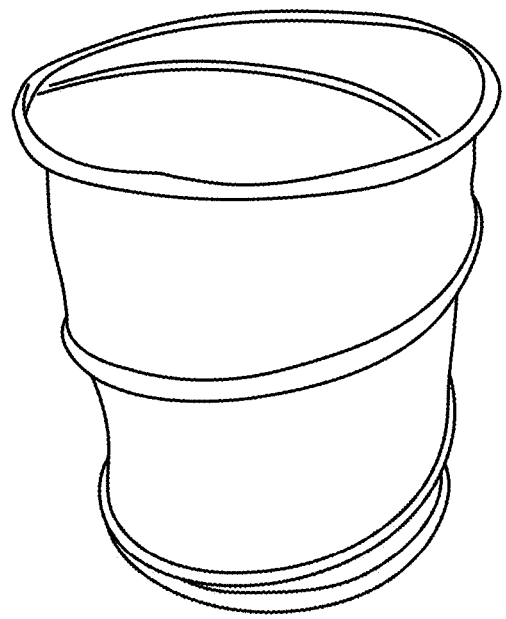

FIG. 2B shows an alternative to a rigid stripping bucket-a collapsible bucket or basket. Some general-purpose collapsible baskets have been repurposed as stripping buckets. While these are easier to transport and stock, the drawbacks are evident. These types of baskets are easily blown away or may fall off a boat in even mild environments. A weight can be placed in the bottom of the collapsible basket, but this eliminates the low weight benefit of the collapsible stripping bucket. Even if a weight is placed in the bottom, the soft sides are still prone to deform in wind or when in contact with a person or other object, resulting in a greater likelihood that not all of the line remains in the basket, reducing the efficiency of lifting the line during casting.

Figure 2C:
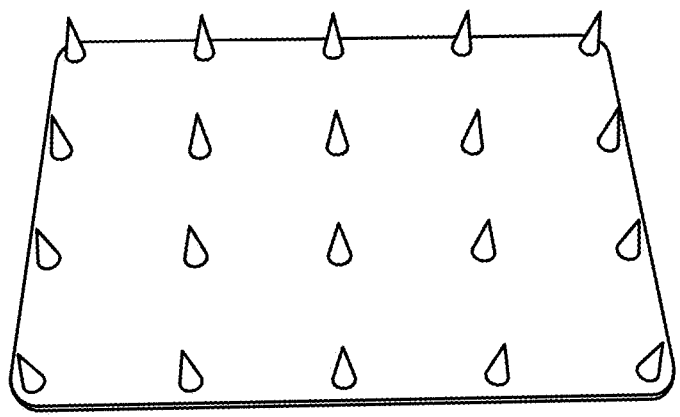

FIG. 2C shows a stripping mat as described above. Rigid and flexible stripping mats suffer from respective deficiencies like those above. Both can "catch" wind and blow off a boat deck, or bounce off in surf. They are large and, due to the dimensions and spikes, difficult to carry and pack, even when flexible materials are used. They protect a smaller proportion of the line than a container and do not guarantee that stripped line will be captured. They can also still permit line to become tangled or difficult to cast.

Figure 2D:
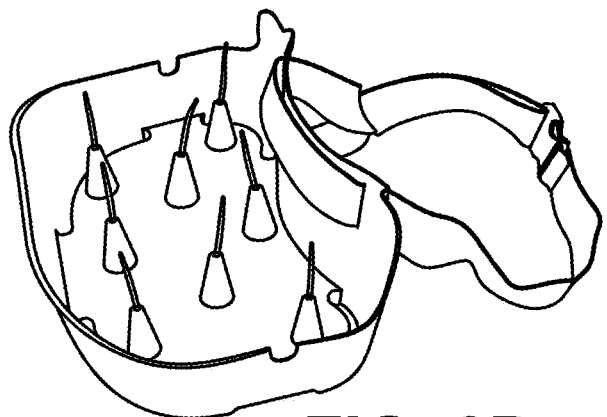

FIG. 2D shows a stripping bucket that is worn by the user. These present their own drawbacks. They can be clumsy and uncomfortable to wear, and may limit the range of motion for the angler or rod. Such stripping buckets generally hold less line than line management apparatuses positioned farther from the user and are more likely to tangle as line can wrap around the bottom of the bucket or become pinched between the bucket and the user.

Figure 3A:
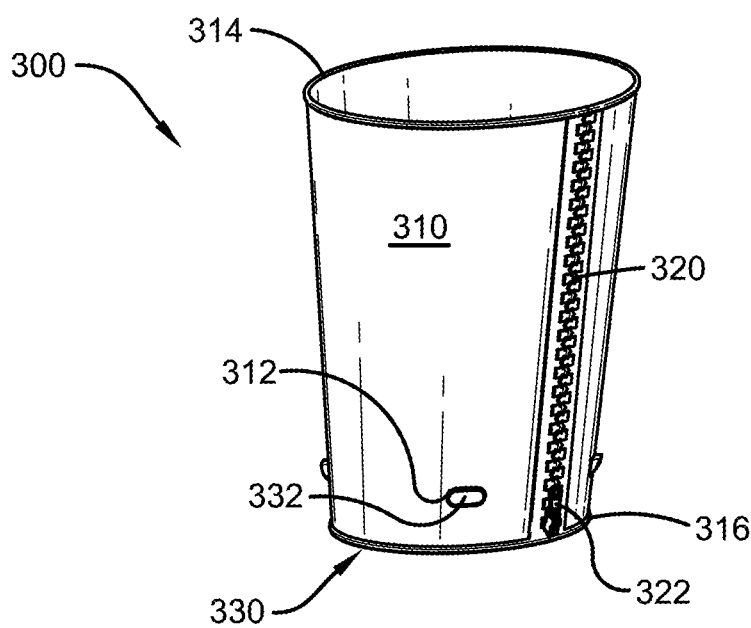
FIG. 3A and FIG. 3B illustrate views of an example line management apparatus according to the disclosure.
Figure 3B:
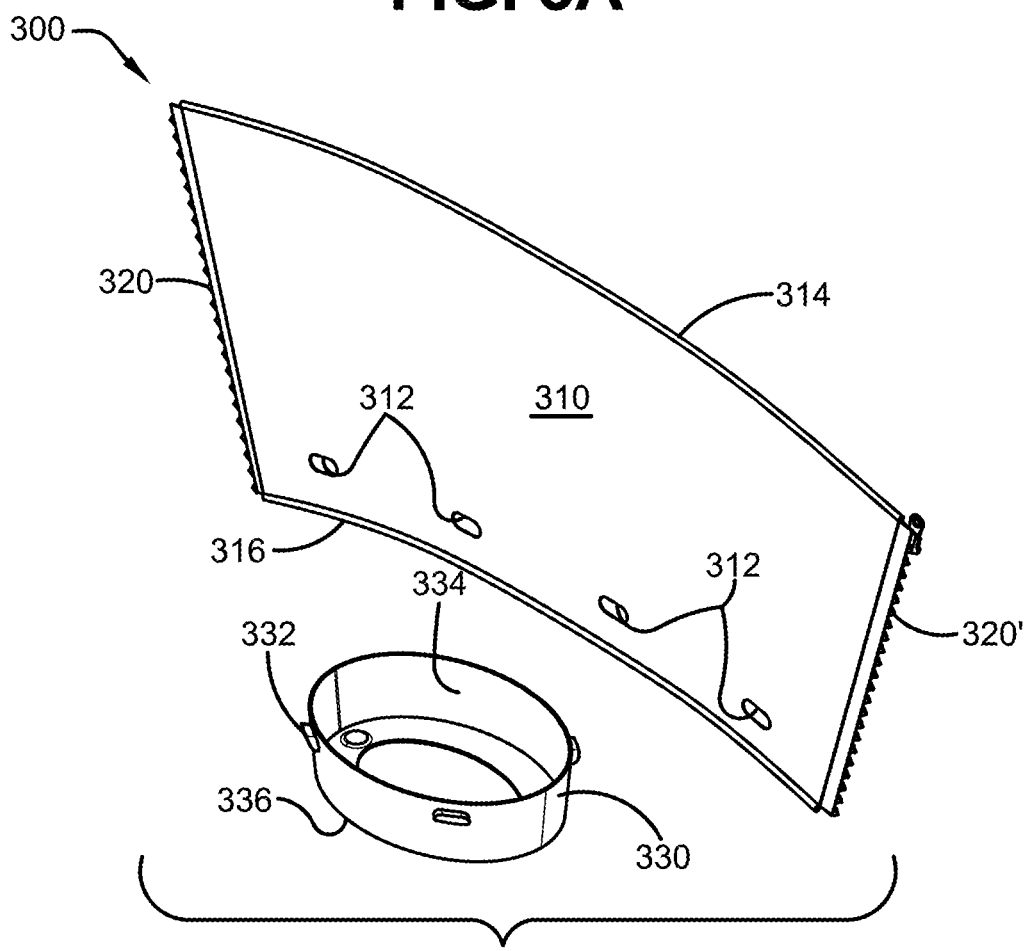

The modular stripping bucket 300 of FIG. 3A and FIG. 3B, disclosed herein, addresses these shortcomings. Modular stripping bucket 300 is comprised of wall section 310 and base section 330. Wall section 310 can be removed from base section 330 and laid flat, rolled, or otherwise arranged separately for easy transportation and storage. In the embodiment illustrated, wall section 310 includes zipper 320, comprised of first zipper section 320 and second zipper section 320' configured to engage one another using slider 322.

Base section 330 can include one or more lugs 332 that are configured and sized to pass through one or more apertures 312 such that wall section 310 can be secured to base section 330. While lugs 332 (and apertures 312) are shown as having a rounded cross section, various other shapes can be used without departing from the scope or spirit of the innovation. In embodiments disclosed herein, apertures 312 (or apertures in any figure) can be reinforced or strengthened with thickened material or a different material (e.g., stitching, plastic, metal, carbon fiber) to prevent wear, slipping, tearing, et cetera.

Base section 330 can be formed of various materials in accordance with this disclosure. Rubber, polymers, carbon fiber, and other materials can be utilized. In embodiments, base section 330 can be made to a particular weight (e.g., greater than 5 pounds, greater than 10 pounds, greater than 20 pounds) to stabilize stripping bucket 300 upright in wind or on the surface of a moving boat. In alternative or complementary embodiments, base section 330 can include weighted materials (e.g., attached to or embedded in the exterior material) to stabilize stripping bucket 300. In alternative or complementary embodiments, base section 330 can include additional components to stabilize stripping bucket 300 upright (e.g., hardware for anchoring or fixing base section 330 to a boat deck or other surface, hook and loop material, adhesives, or magnets). In embodiments, a surface coating can be applied to one or more faces of base section 330 to, for example, increase friction, decrease friction, protect base section 330 against wear or discoloration, or provide other benefits for the utility or longevity of base section 330.

Base section 330 can include a non-slip treatment, which can be applied to any portion of base section 330, to prevent slipping of base section 330 in relation to a surface (e.g., a boat deck) and/or wall section 310 (e.g., resisting rotation or translation placing stresses on apertures 312). The non-slip treatment can include a rubberized coating or application of another non-slip material, or the application of texture (e.g., stippling) to increase grip.

Wall section 310 can include top and bottom dimensions, which can be measured in terms of length, cross-sectional dimensions when zipped (e.g., diameter for buckets with a substantially circular cross-section, other dimensions for buckets with oval or other cross-sectional shapes), or other dimensions. Likewise, base section 330 can include dimensions such as circumference and height. In embodiments, base section 330 is substantially cylindrical and has substantially equivalent top and bottom dimensions. In embodiments, base section 330 can be tapered or flared such that a bottom dimension is smaller or larger than a top dimension.

In an embodiment, apertures 312 can be disposed toward the bottom of wall section 310 such that when apertures 312 are aligned with lugs 332 of base section 330 wall section 310 mates with base section 330 without coming in contact with a surface below base section 330. In an alternative embodiment, apertures 312 can be arranged such that when apertures 312 are aligned with lugs 332 of base section 330, the bottom of wall section 310 (and/or edge member 316) is aligned with the bottom of base section 330.

A bottom of wall section 310 can have a dimension substantially equal to, or slightly greater than (within tolerances) of a corresponding dimension (e.g., where lugs 332 align with apertures 312) of base section 330. In embodiments, tolerances for differences between a bottom dimension of wall section 310 and base section 330 can be less than the difference between a height of lug 332 (e.g., the distance that lug 332 extends beyond base side 334). In embodiments, tolerances for differences between a bottom dimension of wall section 310 and a base section 330 can be less than the diameter or thickness of a fly line. Base section 330 can also include foot 336, which can be substantially perpendicular to base side 334, or intersect base side at another angle, enclosing some or all of the bottom of base section 330. Based on the angle of base side 334 to a flat surface below stripping bucket 300, base section 330 can be cylindrical (e.g., of substantially constant cross-section dimensions), or flared or tapered, along its height.

In embodiments, a top dimension of wall section 310 can be larger than a bottom dimension of wall section 310. In this manner, when modular stripping bucket 300 is assembled with zipper section 320 closed and wall section 310 attached to base section 330, the top of modular stripping bucket 300 can be wider than the bottom of modular stripping bucket 300. In embodiments, a top dimension of wall section 310 can be equivalent to the bottom dimension of wall section 310, such that modular stripping bucket 300 is substantially cylindrical when assembled.

Wall section 310 can include edge members 314 and 316. In embodiments edge members 314 and 316 can reinforce, protect, or stiffen the top and bottom edges of wall section 310. Edge members 314 and/or 316 can include various surface treatments, including treatments to increase friction or tackiness (to resist imparting stress on apertures 312 by limiting movement of wall section 310 relative to base section 330, or to reduce the likelihood that fly line blows out or off of stripping bucket 300); or treatments to decrease friction or tackiness (to allow fly line to be pulled from stripping bucket 300 without significant friction impeding a cast); or others. Edge members 314 and 316 need not be included in every embodiment, and it is contemplated that embodiments of wall section 310 include only the flexible wall, zipper 320, and aperture(s) 312.

Wall section 310 defines a flexible wall that can be formed of various appropriate materials that are sufficiently stiff to avoid sagging or deformation during normal use but flexible enough to roll and unroll without breaking. In embodiments, flexible wall is flexible along one axis but not another, e.g., it can be rolled or bent about a vertical axis from bottom to top (bending along the length between first zipper section 320 and second zipper section 320') but resists rolling or bending in a perpendicular direction, e.g., the bottom cannot be rolled toward the top or vice versa about a horizontal axis. In embodiments, wall section 310 can be laid flat, and can remain at rest in a flat position, while still being sufficiently flexible to easily bend to align with lugs 332 and to easily allow closure of zipper 320. In an embodiment, polypropylene or other polymers can be used in some or all of the materials for wall section 310. In alternative or complementary embodiments, other materials may be used, for example, rubber, carbon fiber, metal, natural fibers, et cetera. In embodiments, wall section 310 can be formed of a single sheet of material (excluding zipper 320 and edge members 314 and 316). In embodiments, wall section 310 can be formed of woven materials. In embodiments, wall section 310 can be formed of multiple layers of materials. In embodiments, a surface coating can be applied to one or both sides of wall section 310 to, for example, increase friction, decrease friction, protect wall section 310 against wear or discoloration, or provide other benefits for the utility or longevity of wall section 310.

The materials used for base section 330 and wall section 310 can be selected for marine use, such that they do not swell, deform, or degrade based on exposure to moisture, heat, sunlight, or salt. Zipper 320 can be a marine zipper.

The total height of stripping bucket 300 can vary, and different embodiments can be different heights according to user preferences. In embodiments, a height may be from 20 to 26 inches from the bottom of base section 330 to the top of wall section 310. In embodiments, a height may be less than 20 inches, or more than 26 inches. In embodiments, different shapes and sizes of wall section 310 can be compatible with a single base section 330 to allow for different applications or customization. For example, some users or applications may call for a wider or narrower top (e.g., different wind levels or fly line weights), or a taller or shorter wall (e.g., different user height, user on casting platform versus boat deck). Different colors, patterns, or pictures can be provided on wall section 310 for additional customization. Without explicitly providing an exhaustive description of the various dimensions and angles, such variants are understood to fall within the scope and spirit of this disclosure.

To assemble stripping bucket 300, wall section 310 is arranged over base section 330 such that one or more lugs 332 pass through one or more corresponding apertures 312. This secures wall section 310 in place with respect to both translation and rotation and prevents gaps large enough for the fly line to become tangled or stuck. Zipper section 320 is closed, preventing wall section 310 from rolling, unrolling, or otherwise moving, and securing wall section 310 to base section 330. To disassemble stripping bucket 300, zipper section 320 is opened, allowing wall section 310 to be unrolled or moved to pass apertures 312 over the lugs and detach wall section 310 from base section 330.

Stripping bucket 300 can thus be assembled and disassembled for easy use and transport. Because wall section 310 can be flattened, rolled, or otherwise stowed easily, and base section 330 can be carried separately, the impediments of rigid stripping buckets described above can be overcome. Likewise, because stripping bucket 300 is rigid or semi-rigid when assembled, it does not suffer from the shortcomings of flexible baskets. Further, it is easy to stock in inventory as two or more base sections 330 can be stacked and two or more wall sections 310 can be stacked or stored together to reduce the floor space required for a store to carry multiple stripping buckets. Further, as will be described below, embodiments of base section 330 incorporating magnets (and/or other retention members aiding attachment or stability) and/or drainage openings can be made for reduced weight and easy carriage (e.g., by grabbing the base like a handle through one or more appropriately sized drainage holes).

Figure 4:
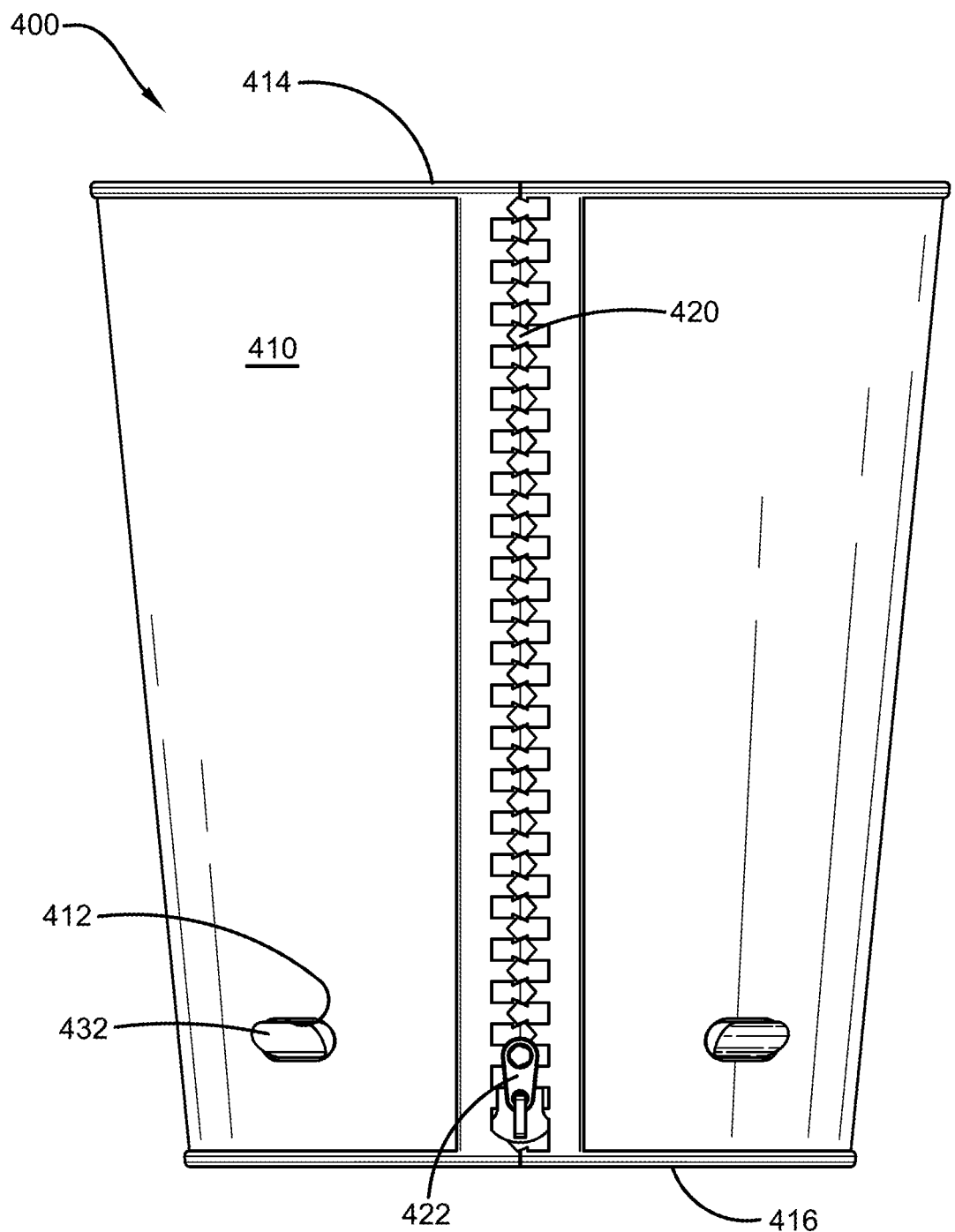
FIG. 4 illustrates an elevation view of an example line management apparatus according to the disclosure.

FIG. 4 shows a view of another embodiment of a stripping bucket 400. Stripping bucket 400 includes wall section 410 and base section 430. Wall section 410 includes zipper 420, edge members 414 and 416, and apertures 412. Base section 430 includes lugs 432.

Figure 5:
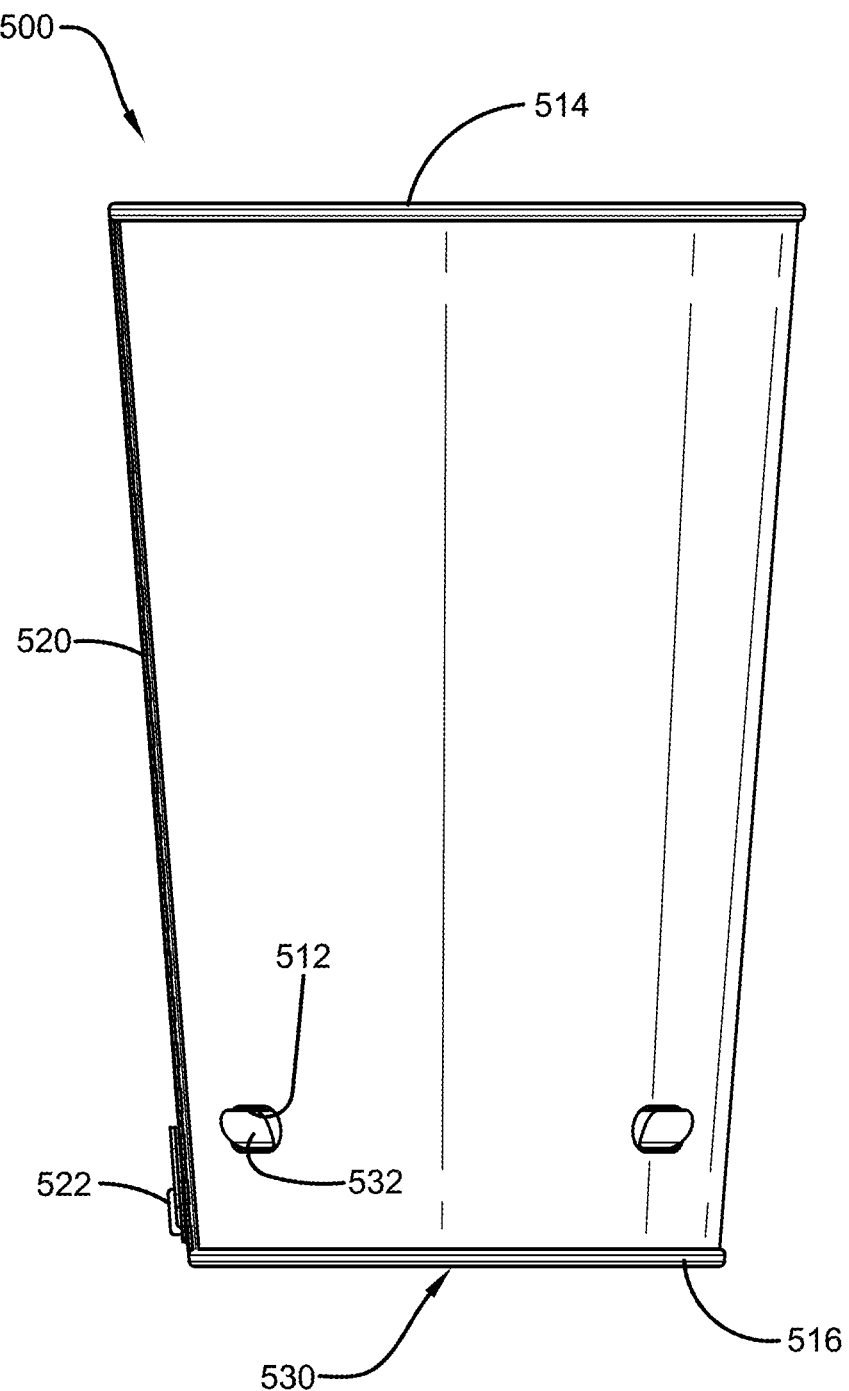
FIG. 5 illustrates an elevation view of another example line management apparatus according to the disclosure.

FIG. 5 shows a view of another embodiment of a stripping bucket 500 with different dimensions and angles than stripping bucket 400. Stripping bucket 500 includes wall section 510 and base section 530. Wall section 510 includes zipper 520, edge members 514 and 516, and apertures 512. Base section 530 includes lugs 532. As can be appreciated in view of the disclosure, the height, length, width, cross-sectional dimensions, angles between sections or components, angles with respect to a fixed surface (e.g., ground), et cetera, can vary widely between embodiments, but all such variants are embraced by the scope and spirit of the disclosure herein.

Figure 6:
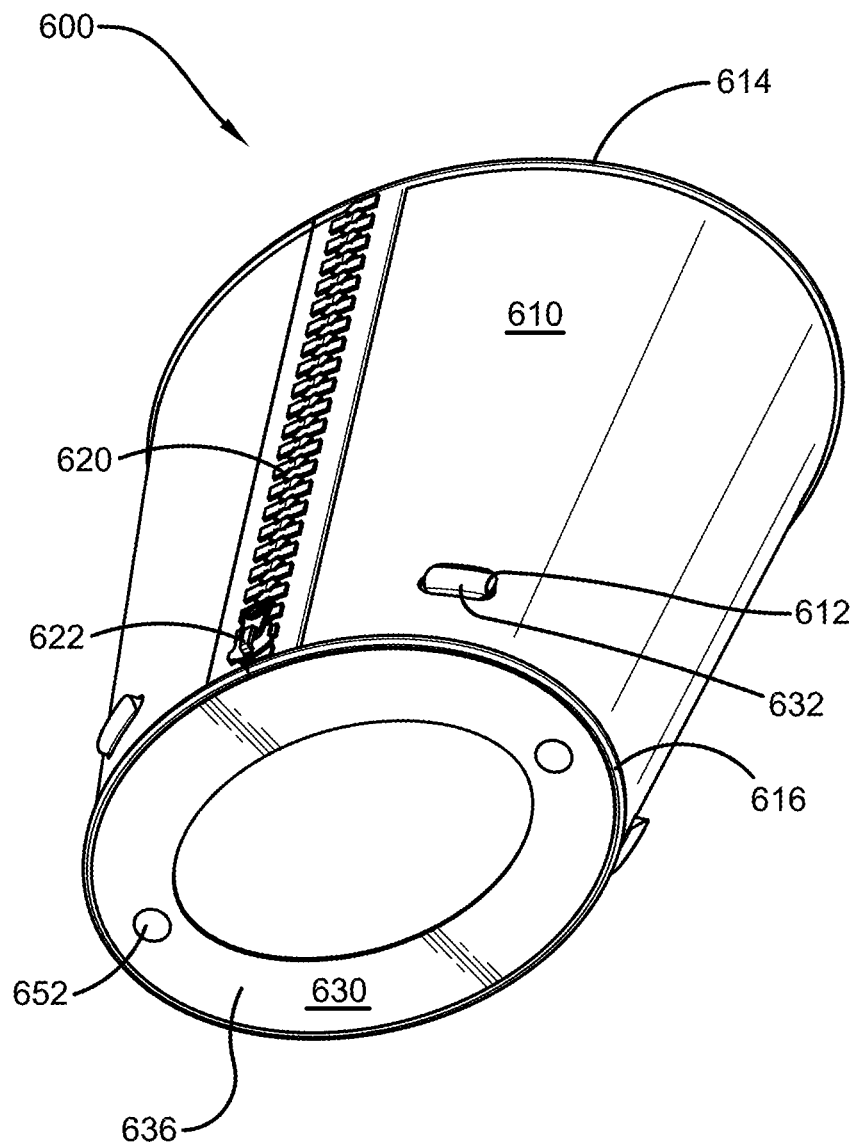
FIG. 6 illustrates a bottom perspective view of an example line management apparatus according to the disclosure.

FIG. 6 shows another embodiment of a stripping bucket 600. Stripping bucket 600 can have different dimensions than those of, e.g., stripping buckets 500, 400, and 300. Stripping bucket 600 includes wall section 610 and base section 630. Wall section 610 includes zipper 620, edge members 614 and 616, and apertures 612. Base section 630 includes lugs 632.

Base section 630 of stripping bucket 600 incorporates aspects that can be included in one or more embodiments of stripping buckets disclosed herein. Base section 630 can include ringed foot 636. Ringed foot 636 occludes some, but not all, of base section 630. By defining an opening or drainage hole, ringed foot 636 provides stability while allowing drainage from stripping bucket 600. This prevents water from building up in stripping bucket 600, and further allows a fly line therein to be rinsed or cleaned (to remove the buildup of salt or other materials for improved performance related to casting or floating or sinking depending on the line type).

While FIG. 6 shows a particular ringed base 636, it is understood that other dimensions and shapes can be utilized without departing from the scope or spirit of the innovation. The opening forming a foot need not have a shape substantially similar to the cross-section of the base or stripping bucket; a foot may be larger or smaller to define larger or smaller openings; or a foot may have more than one opening formed therein to provide multiple drainage holes, such drainage holes being sized, spaced, and arranged in any configuration. In alternative or complementary embodiments, the base side can include one or more drainage openings, which can also align with one or more drainage openings below the apertures of a stripping bucket wall.

In embodiments, one or more drainage holes can be sized large enough to permit a user to grip the base through the drainage hole, providing for easy and secure carriage. The base section can also be constructed to allow for lashing the base using a rope or other tether. In embodiments, the base section can include recessed portions sized to allow a rope or tether to pass through such that the stripping bucket sits flat on an even surface when lashed or tethered.

Base section 630 illustrates one or more retention members. The retention members can be one or more magnets 652. Magnets 652 can be incorporated into base section 630 to provide an attractive force between stripping bucket 600 and a metal surface, such as the hull of a boat. While one or more magnets 652 are shown incorporated into or attached to the ringed foot of the base, in other embodiments one or more magnets can be in contact with any other portion of a base or different embodiments of a foot. By using magnets, stripping bucket 600 can be kept upright and prevented from falling without increasing the weight of base section 630.

While one or more magnets 652 and the drainage hole formed by ringed foot 636 are only depicted in FIG. 6, it is understood that one or both of these aspects (or multiples of one or both aspects) can be incorporated into any stripping bucket embraced under the scope of this disclosure.

In an embodiment, spikes or other means of capturing line can be arranged to protrude from a foot of a base section. Spikes are wider at the bottom and taper toward the top to capture fly line while allowing it to be drawn out easily during a cast or reeling.

The many features and advantages of the disclosure are apparent from the detailed specification and it is intended to cover all such features and advantages of the disclosure, which fall within the true spirit and scope of the disclosure. Since numerous modifications and variations will readily occur to those skilled in the art, it is not desired to limit the disclosure to the exact construction and operation illustrated and described, and, accordingly, all suitable modifications and equivalents that fall within the scope of the disclosure of this application are supported for claiming in this or related applications.

What is claimed is:

1. A stripping bucket, comprising:
   a base section comprising:
   a base foot arranged at a bottom of the base section and configured to rest on a flat surface;
   a base side extending upward from the base foot and defining a perimeter edge around the base section, the perimeter edge extending between the base foot and a top edge;
   one or more lugs extending outward from the perimeter edge, wherein the one or more lugs are arranged above the base foot and below the top edge; and
   a flange extending inward from the base section defining the base foot, wherein the flange defines an opening; and
   a wall section comprising:
   a flexible wall;
   one or more apertures disposed toward a bottom of the flexible wall, wherein the one or more apertures are positioned and sized within the flexible wall to receive the one or more lugs;
   a first zipper section disposed on a first side of the flexible wall; and
   a second zipper section configured to engage the first zipper section to close a zipper defined by the first zipper section and the second zipper section,
   wherein the wall section and the base section form the stripping bucket when the lugs are received through the one or more apertures and the zipper is closed, and
   wherein the wall section is removable from the base section when the zipper is opened; and
   wherein the stripping bucket is configured to contain fishing line unspooled from a reel when the base section and the wall section are coupled by arranging the one or more lugs through the one or more apertures and the zipper is closed.

2. The stripping bucket of claim 1, comprising:
   one or more retention members incorporated into the base section.

3. The stripping bucket of claim 2, wherein the retention members are magnets.

4. The stripping bucket of claim 1, wherein the base section is formed at least in part of rubber.

5. The stripping bucket of claim 1, wherein the base section is formed at least in part of a polymer.

6. The stripping bucket of claim 1, comprising:
   one or more edge members disposed at one or both of a top or a bottom of the wall section.

7. The stripping bucket of claim 1, wherein the zipper is a marine zipper.

8. The stripping bucket of claim 1, wherein the wall section is semi-rigid when the zipper is closed and the wall section is coupled with the base section.

9. The stripping bucket of claim 1, wherein the wall section is configured to be flattened when the zipper is open.

10. A stripping bucket, comprising:
    a base section comprising:
    a base foot arranged at a bottom of the base section and configured to rest on a flat surface;
    a base side extending upward from the base foot and defining a perimeter edge around the base section, the perimeter edge extending between the base foot and a top edge;
    one or more lugs extending outward from the perimeter edge, wherein the one or more lugs are arranged above the base foot and below the top edge;
    wherein the base foot extends over less than an entire bottom area of the base section; and
    a wall section comprising:
    a flexible wall;
    one or more apertures disposed toward a bottom of the flexible wall, wherein the one or more apertures are positioned and sized within the flexible wall to receive the one or more lugs;
    a first zipper section disposed on a first side of the flexible wall; and
    a second zipper section configured to engage the first zipper section to close a zipper defined by the first zipper section and the second zipper section,
    wherein the wall section and the base section form the stripping bucket when the lugs are received through the one or more apertures and the zipper is closed; and wherein the wall section is removable from the base section when the zipper is opened, and wherein the stripping bucket is configured to contain fishing line unspooled from a reel when the base section and the wall section are coupled by arranging the one or more lugs through the one or more apertures and the zipper is closed.

11. The stripping bucket of claim 10, comprising:
one or more retention members incorporated into the base section.

12. The stripping bucket of claim 11, wherein the retention members are magnets.

13. The stripping bucket of claim 10, wherein the base section is formed at least in part of rubber.

14. The stripping bucket of claim 10, wherein the base section is formed at least in part of a polymer.

15. The stripping bucket of claim 10, comprising:
one or more edge member disposed at one or both of a top or a bottom of the wall section.

16. The stripping bucket of claim 10, wherein the zipper is a marine zipper.

17. The stripping bucket of claim 10, wherein the wall section is semi-rigid when the zipper is closed and the wall section is couple with the base section.

18. The stripping bucket of claim 10, wherein the wall section is configured to be flatted when the zipper is open.

19. A method of managing fly fishing line, comprising:
providing a stripping bucket, comprising:
a base section comprising:
a base foot arranged at a bottom of the base section and configured to rest on a flat surface;
a base side extending upward from the base foot and defining a perimeter edge around the base section, the perimeter edge extending between the base foot and a top edge;
one or more lugs extending outward from the perimeter edge, wherein the one or more lugs are arranged above the base foot and below the top edge;
a flange extending inward from the base section defining the base foot, wherein the flange defines an opening; and
a wall section comprising:
a flexible wall;
one or more apertures disposed toward a bottom of the flexible wall, wherein the one or more apertures are positioned and sized within the flexible wall to receive the one or more lugs;
a first zipper section disposed on a first side of the flexible wall; and
a second zipper section configured to engage the first zipper section to close a zipper defined by the first zipper section and the second zipper section,
wherein the wall section and the base section form the stripping bucket when the lugs are received through the one or more apertures and the zipper is closed; and
wherein the wall section is removable from the base section when the zipper is opened, and
unspooling fishing line from a reel into the stripping bucket when the base section and the wall section are coupled by arranging the one or more lugs through the one or more apertures and the zipper is closed.

* * * * *